Nov. 30, 1965 T. P. HEUCHLING ETAL 3,220,201
CRYOGENIC REFRIGERATOR OPERATING ON THE STIRLING CYCLE
Filed Jan. 25, 1965
11 Sheets-Sheet 1

INVENTORS
Theodore P. Heuchling
BY Arthur A. Fowle

Attorney

Nov. 30, 1965    T. P. HEUCHLING ETAL    3,220,201
CRYOGENIC REFRIGERATOR OPERATING ON THE STIRLING CYCLE
Filed Jan. 25, 1965                    11 Sheets-Sheet 3

INVENTORS
Theodore P. Heuchling
BY Arthur A. Fowle

Attorney

INVENTORS
Theodore P. Heuchling
Arthur A. Fowle
BY
Attorney

INVENTORS
Theodore P. Heuchling
Arthur A. Fowle

INVENTORS
Theodore P. Heuchling
Arthur A. Fowle
Attorney

INVENTORS
Theodore P. Heuchling
Arthur A. Fowle

Nov. 30, 1965 T. P. HEUCHLING ETAL 3,220,201
CRYOGENIC REFRIGERATOR OPERATING ON THE STIRLING CYCLE
Filed Jan. 25, 1965 11 Sheets-Sheet 11

INVENTORS
Theodore P. Heuchling
BY Arthur A. Fowle
Attorney

United States Patent Office 3,220,201
Patented Nov. 30, 1965

3,220,201
CRYOGENIC REFRIGERATOR OPERATING
ON THE STIRLING CYCLE
Theodore P. Heuchling, Concord, and Arthur A. Fowle,
Winchester, Mass., assignors to Arthur D. Little, Inc.,
Cambridge, Mass., a corporation of Massachusetts
Filed Jan. 25, 1965, Ser. No. 427,749
39 Claims. (Cl. 62—3)

This invention relates to refrigeration apparatus and more particularly to a small compact cryogenic refrigerator operating on the Stirling cycle.

For many applications, and particularly airborne equipment, there is a need for a compact cryogenic refrigerator capable of reliable operation over an extended period of time without servicing. Although there are many small cryogenic refrigerators in existence, they either are subject to wear which requires their servicing and replacement of parts, or they are extremely complicated and expensive to construct. The so-called Stirling cycle has been successfully employed in many refrigeration apparatus, notably in the Philips engines. However, all of the present embodiments use rotary driving means which in turn require the incorporation of gears, cams, heavily loaded bearings and extremely good seals. Such apparatus does not lend itself to compact design. Moreover, incorporation of such components as gears and cams introduces the use of wearing surfaces in addition to those necessitated by pistons moving in cylinders. This means that such equipment requires periodic maintenance and cannot be left unattended for extended periods of time such as for example 500 to 1,000 hours. It would therefore be desirable to be able to construct a cryogenic refrigerator operating on the Stirling cycle which did not require the auxiliary components added by the use of rotary driving means, and which at the same time was relatively compact and adaptable for use in combination with a variety of other equipment such as infrared detectors and the like.

It is therefore a primary object of this invention to provide a cryogenic refrigerator operating on the Stirling cycle which is extremely compact and reliable. It is another object of this invention to provide refrigeration apparatus of the character described which is capable of delivering refrigeration at levels ranging from 90–4.2° K. It is another object of this invention to provide a cryogenic refrigerator which does not incorporate any rotary motion devices and which therefore eliminates cams, gears, etc. It is yet another object of this invention to provide such a refrigerator which requires a minimum of sealing means and which can be constructed essentially free from all vibratory noises which may interfere with the operation of equipment which it is designed to cool. Yet another object is to provide refrigeration apparatus in a configuration which lends itself to being readily matched to detector devices in an evacuated Dewar housing. Other objects of the invention will in part be obvious and will in part be apparent hereinafter.

The invention accordingly comprises features of construction, combination of elements and arrangement of parts which will be exemplified in the constructions hereinafter set forth, and the scope of the invention will be indicated in the claims.

For a fuller understanding of the nature and objects of the invention reference should be had to the following detailed description taken in connection with the accompanying drawings in which FIG. 1 is a cross-section of one embodiment of the refrigerator of this invention which incorporates two opposed compressors and a single expander;

Figure 6:
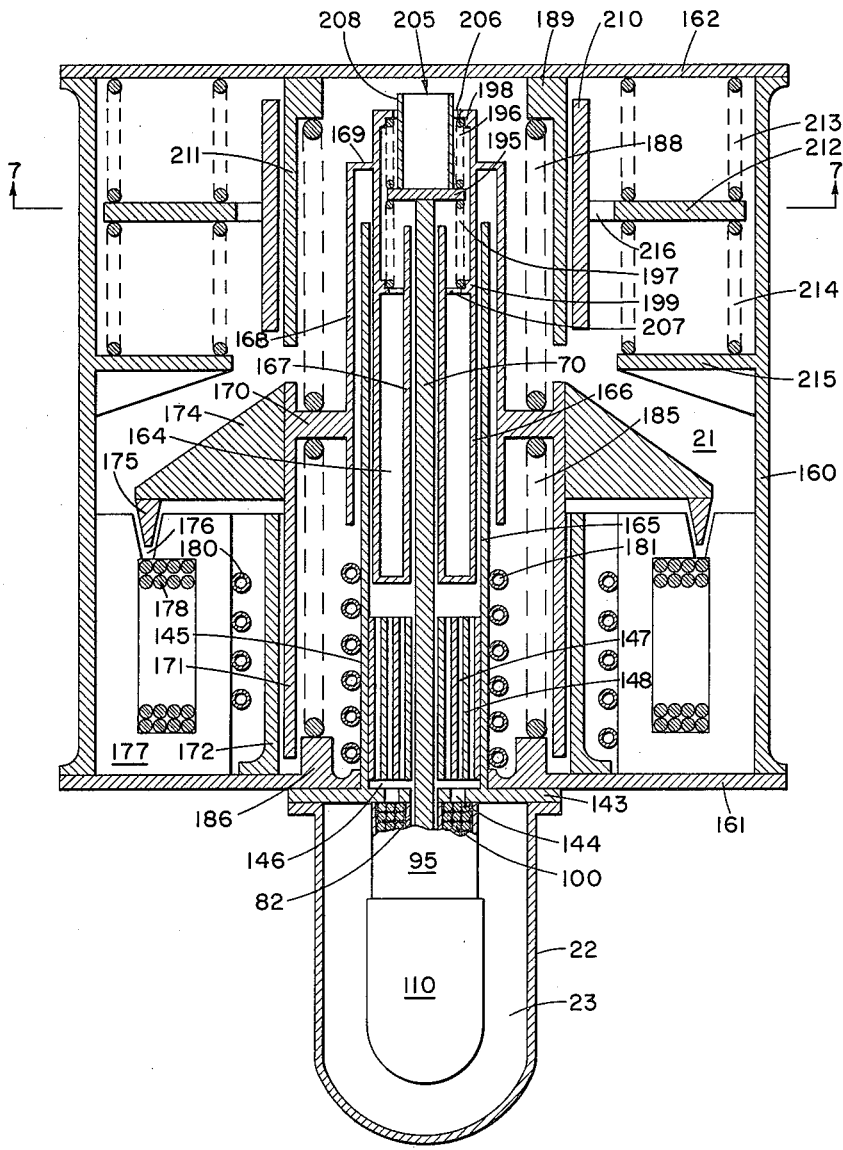
FIG. 6 is a cross-sectional view of another embodiment of the apparatus of this invention in which a single compressor and expander are arranged in axial alignment and have a common linear actuator.
Figure 8A:
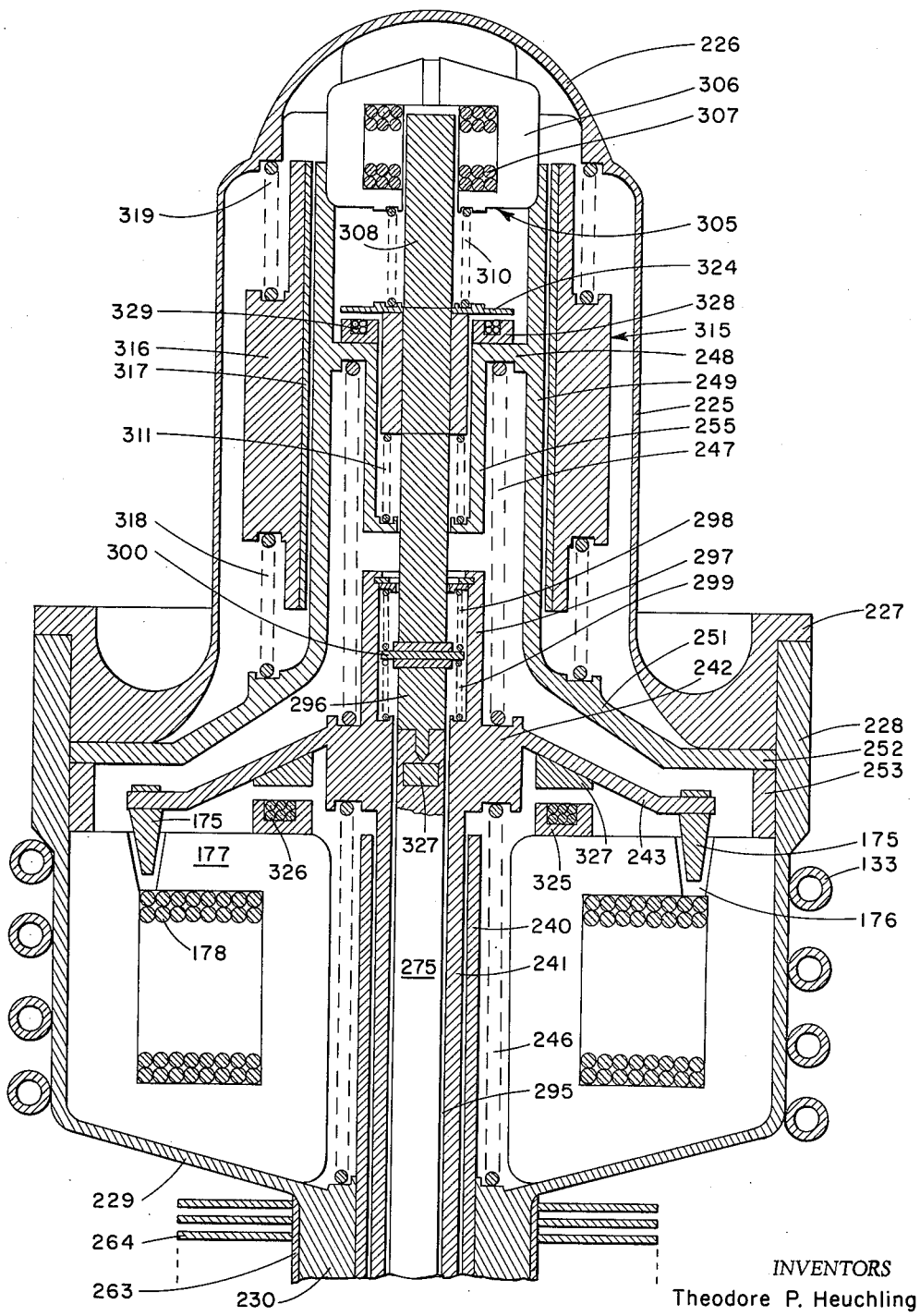
Figure 8B:
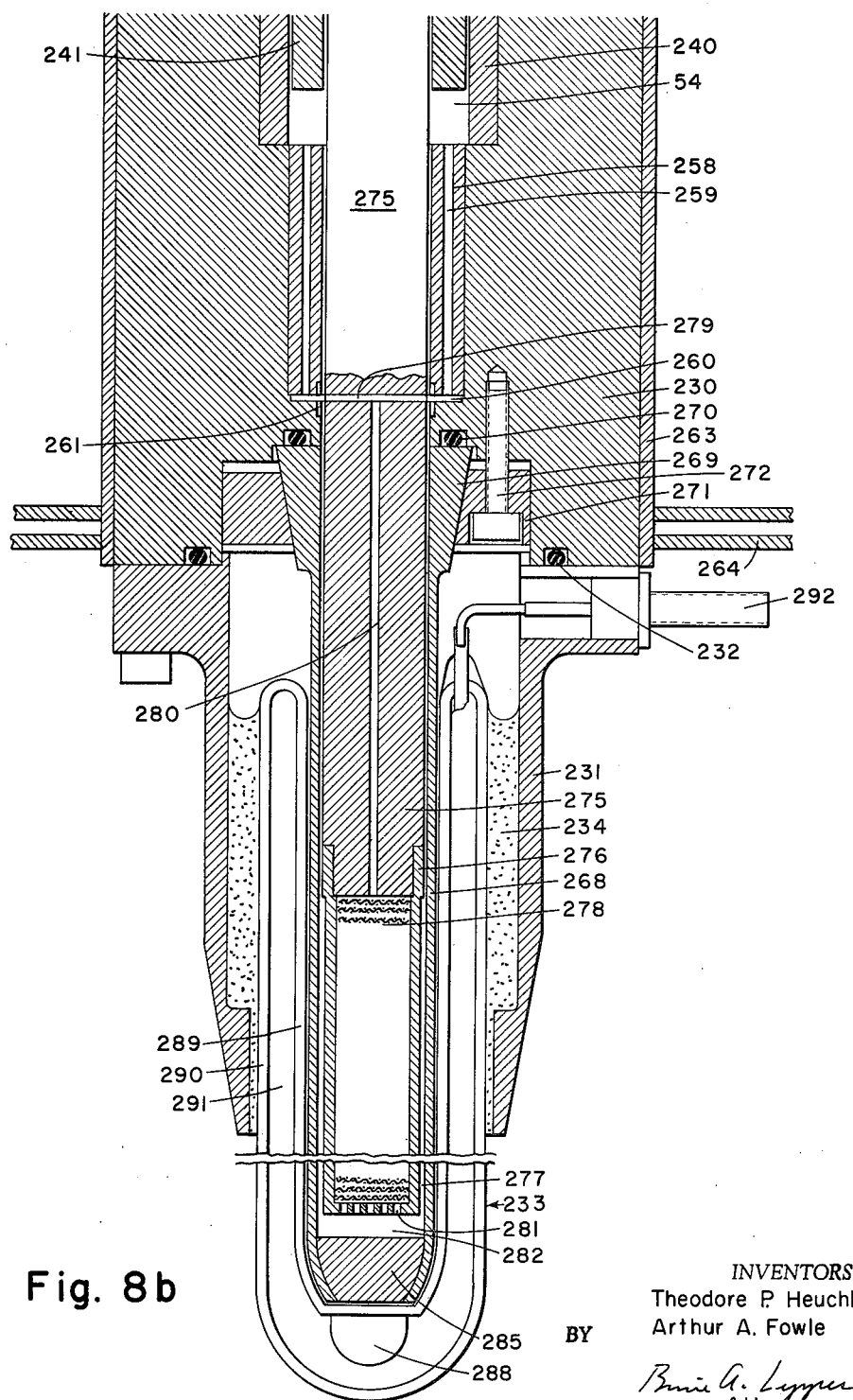
Figure 9:
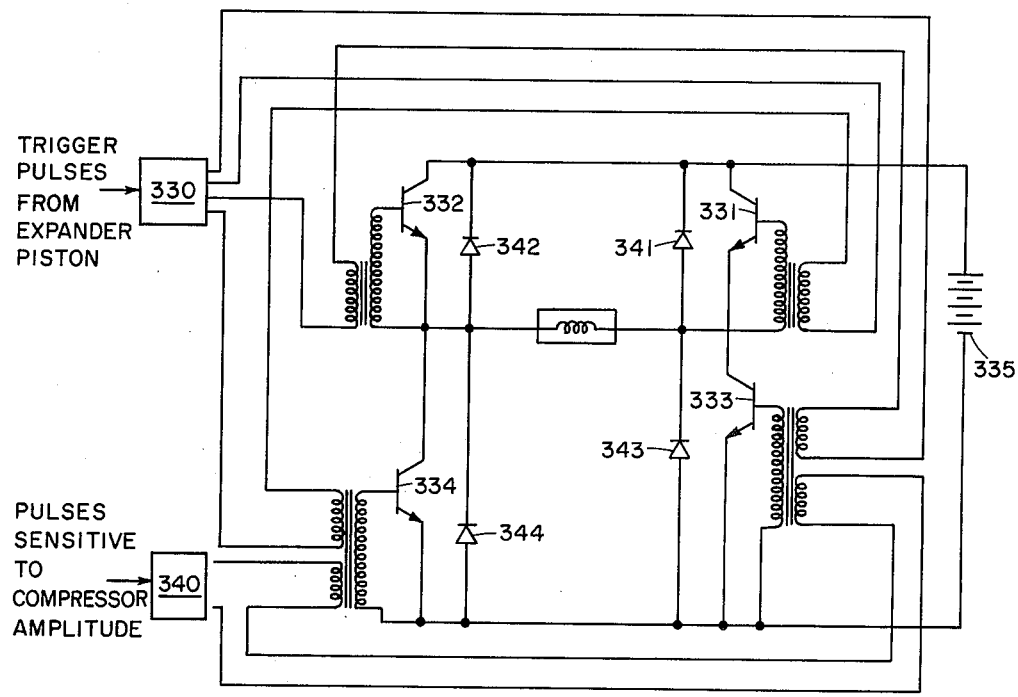
Figure 10:
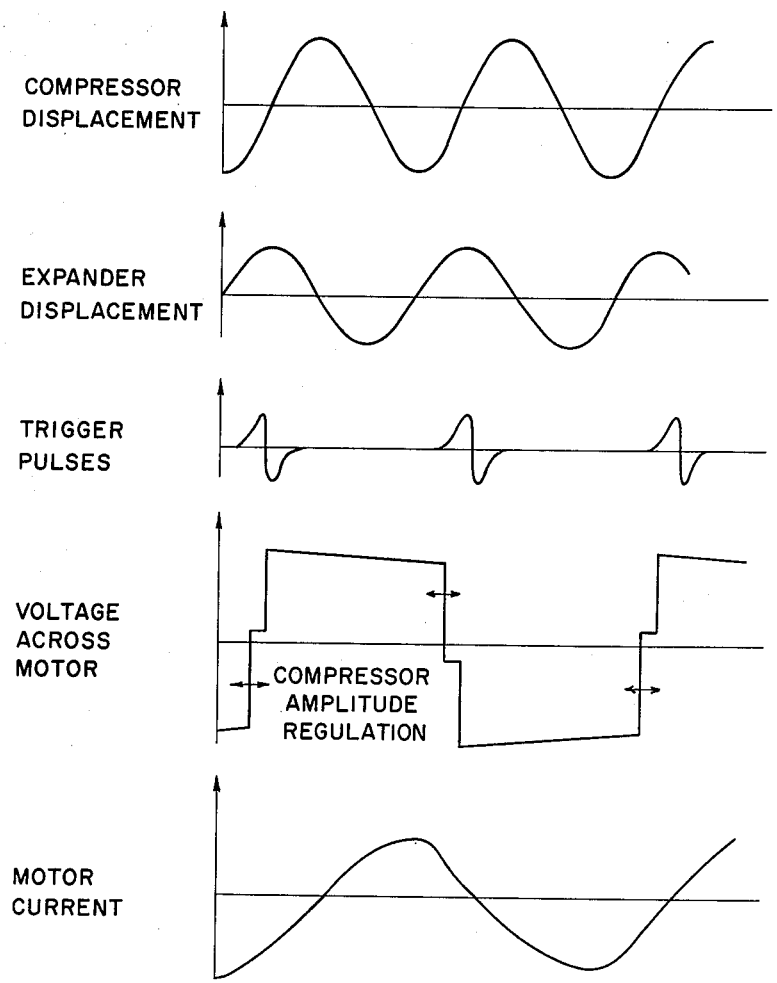
Figure 11:
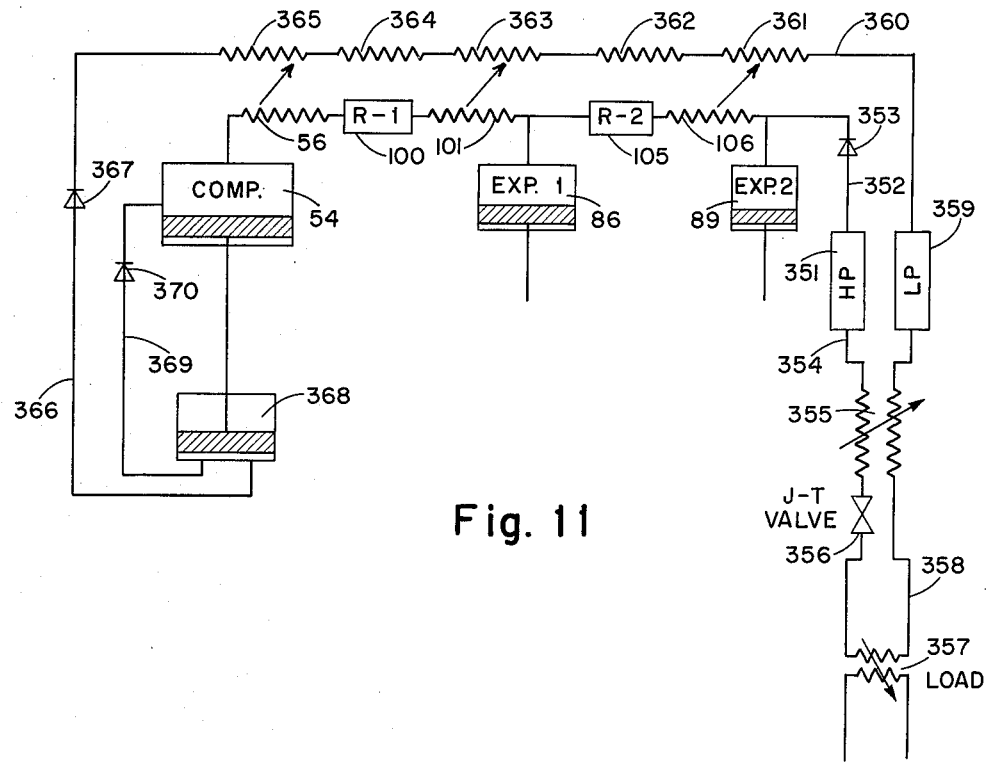
Figure 12:
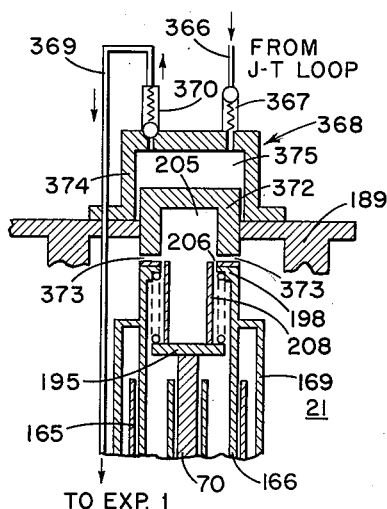

FIGS. 8a and 8b in combination are cross-sectional view of another embodiment of the refrigerator of this invention showing a detector cell incorporated therewith;

FIG. 9 shows a typical basic inverter circuit employed to drive the linear actuator of the refrigerator of FIGS. 8a and 8b;

FIG. 10 is a plot of the waveforms of current and voltage associated with the linear actuator of the refrigerator of FIGS. 8a and 8b;

FIG. 11 is a schematic diagram showing the incorporation of an external Joule-Thomson loop into the refrigerator of this invention; and FIG. 12 is a fragmentary cross-section of the top portion of the refrigerator of FIG. 6 showing its modification to form a booster compressor and its use in the apparatus sketched in FIG. 11.

The so-called Stirling cycle is well-known. It is a closed cycle combining one or more compressors connected through aftercooling means and regenerator means to one or more expanders. Compression and expansion are isothermal processes and in operation the pressure in the system drops with temperature at such a rate as to keep the fluid volume within the system essentially constant. A typical prior art, Stirling cycle refrigerator (see for example U.S.P. 2,764,877) comprises a closed cylindrical housing in which a compressor piston and expander piston are made to reciprocate in the proper sequence by rotary driving means attached to the pistons through gears, crank shafts, cams, and cam followers. There is usually no need to minimize or eliminate the vibrational motion associated with such equipment and refrigerators constructed in this usual manner do not lend themselves to a compact arrangement. In all the prior art devices it is necessary to use efficient sealing means, some of which are at very low temperatures.

The cryogenic refrigerator of this invention eliminates all rotary motion, provides for tuned systems wherein any dynamic imbalance and vibratory motion is minimized or essentially eliminated, eliminates any seals between pistons and the cylinders in which they move, and uses only a few wearing parts which are lightly loaded. The result is a compact, reliable cryogenic refrigerator.

In brief the refrigeration apparatus described herein is a hermetic Stirling-type device which uses a unique linear actuator means and employs dry journal bearing surfaces using matching surfaces having low friction characteristics. Dynamic vibration absorbers are used to achieve the required dynamic balance and coil springs are used to balance the inertia forces attendant to the shuttling mass of the armature of the linear actuator, of the compressor and of the connecting structure in order to reduce the force requirements and hence the size of the linear actuator.

As will be seen, two opposing compressors may be used with a single expander, each compressor and the expander having its own linear actuator. Alternatively, a single compressor may be arranged in axial alignment with the expander, in which case the compressor and expander may be driven by separate linear actuators or by a single linear actuator. Each of these modifications incorporate dynamic balancing systems and vibration control means.

Figure 1:
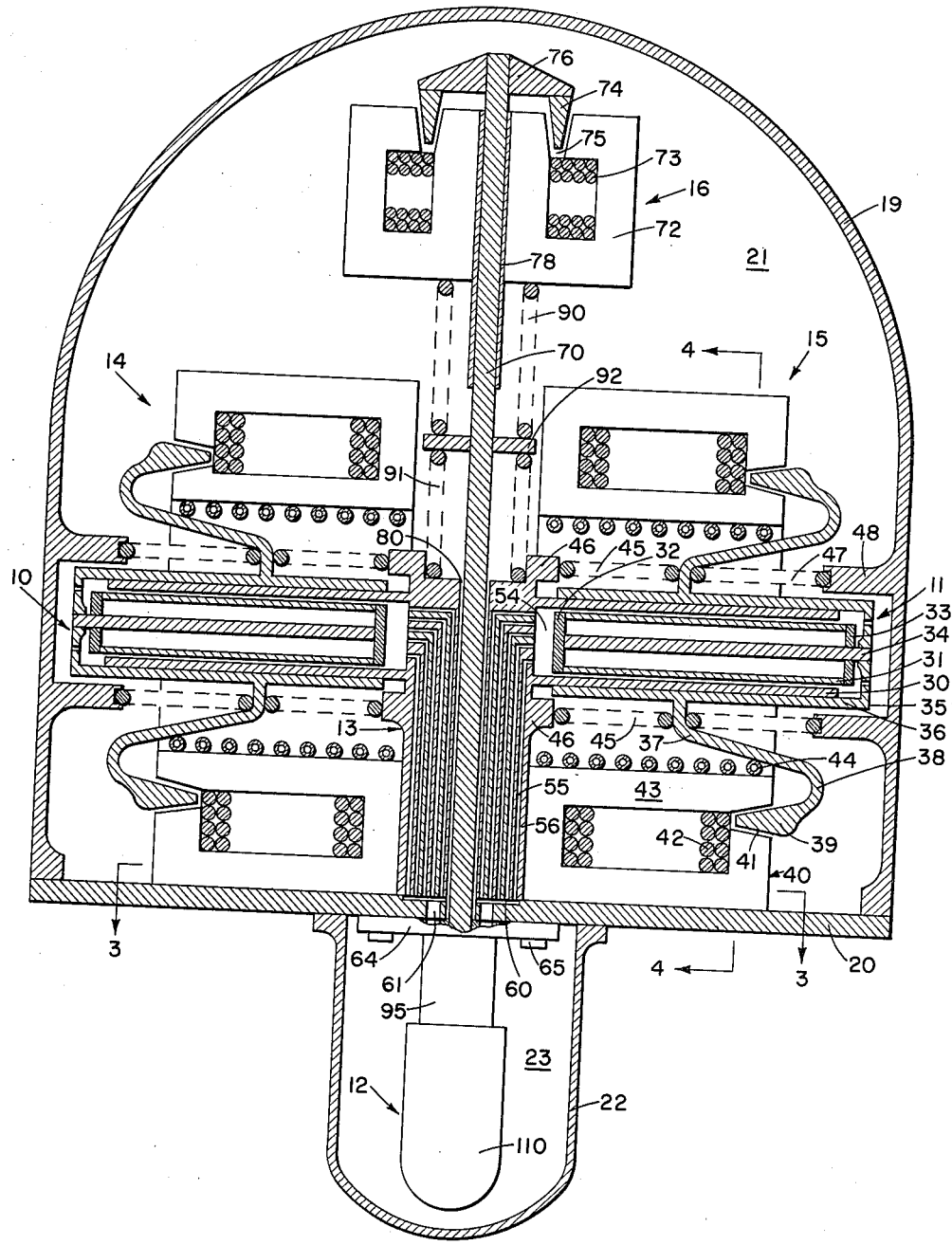

FIG. 1 illustrates one embodiment of this invention in which two opposed compressors are provided to furnish compressed fluid to a single two-stage expander wherein refrigeration is developed and made available to an exteral load.

Figure 2:
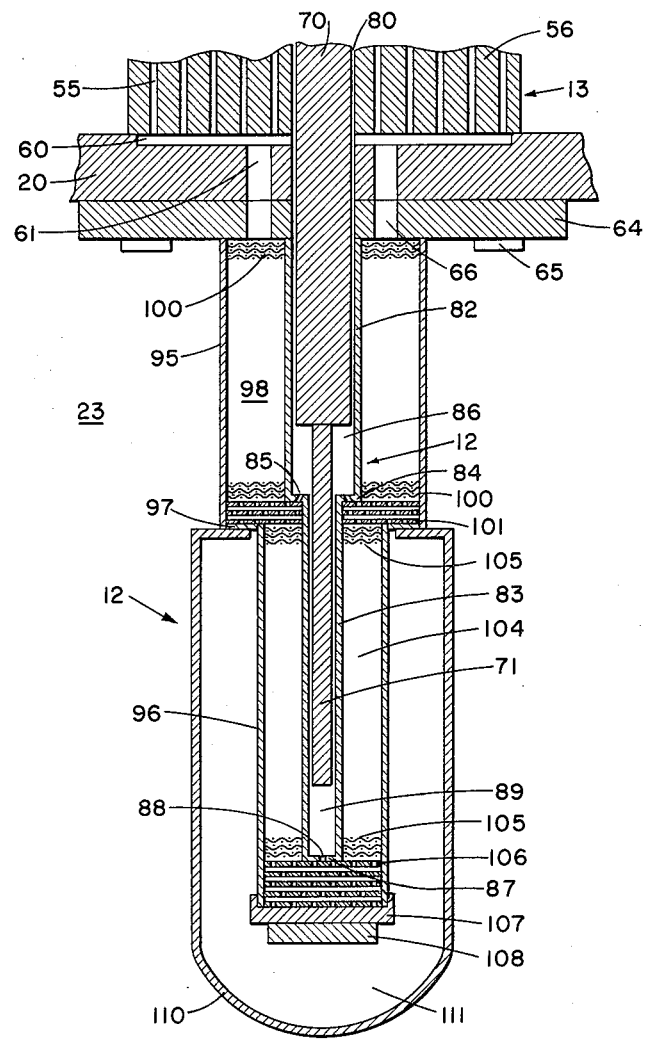
FIG. 2 is an enlarged detailed cross-sectional drawing of the heat exchange system of the refrigerator and of the expander of the embodiment of FIG. 1.

In FIG. 1 the compressors are generally indicated at 10 and 11 and the expander at 12, the latter being shown in cross-sectional detail in FIG. 2. The compressors and expander are connected by a solid block, generally indicated at 13, which along with its other functions to be described provides a plurality of fluid passages between the compressors and the expander. The two compressors are driven by opposed electrical linear actuators described in detail in Serial Number 363,789 filed in the names of Theodore P. Heuchling and Richard E. Kronauer and assigned to the same assignee as the present application. Reference should be had to this copending application for a complete description of the linear actuator and the various forms which it may take. However, sufficient detail will be provided herein adequately to describe this linear actuator and its function in the refrigerator. A linear actuator 16 is also provided for the expander and in essence it serves as a generator even though some of the work delivered by the expander is used for overcoming frictional loads in the expander system.

The refrigerator is enclosed in a main housing 19 which is mounted on a base 20 and from which is suspended an auxiliary housing 22. The volume 21 within main housing 19 is pressurized with the working fluid used in the refrigerator, the level of pressure being preferably intermediate between the maximum and minimum pressure obtaining within the refrigerator system. The volume 23 defined by auxiliary housing 22 is, on the other hand, evacuated, preferably down to about $10^{-5}$ torr in order to minimize any heat transfer from the surroundings into the cold expander of the refrigerator.

It will be appreciated from an examination of FIG. 1 that the compressors are completely symmetrical and that it is necessary to describe only one of them since the other is identical. Each compressor cylinder is a tubular extension 30 of the main central block 13 and within it reciprocates the compressor piston which is preferably hollow. This piston is made up of a cylindrical wall 31 and two end pieces 32 and 33. The cylindrical section 31 of the compressor piston and the inner wall of the tubular extension 30 serving as the compressor cylinder are formed of a material which has a very low coefficient of friction and expansion. The material is one which preferably contains some solid lubricant as a filler such as molybdenum disulfide or the like. As an example of such a material we may cite Rulon-A which is a filled Teflon (polytetrafluoroethylene) manufactured by the Dixon Corporation. The compressor piston is, of course, reciprocated directly by the linear actuator and this in turn requires that the piston be connected in such a manner that it will not impart any lateral force on the armature of the linear actuator which would cause it to make contact with the stator of the linear actuator. The required type of attachment of these two elements in the embodiment of FIG. 1 is achieved through the use of a quill shaft and guiding mechanism. The piston is attached to the flexible quill shaft 34, only through end piece 32. The quill shaft 34 is strong in compressive loading but does not exert side loads on the piston. That end of the quill shaft which is not attached to the piston is affixed to the linear actuator through a drive mechanism which comprises an end plate 35, a cylindrical section 36, a horizontal support section 37, and a necked portion 38, the latter being integral with the moving member or armature 39 of the linear actuator. The cylindrical section 36 of the drive mechanism fits down over the outside of the tubular extension 30 serving as the compressor cylinder, and the contacting surfaces of these two members are preferably formed of materials having low coefficients of friction.

The linear actuator used is of the circular type wherein the stator 40 provides an annular, conically-shaped gap 41 in which the armature reciprocates. It is made up of a plurality of wedge shaped laminae 43 as shown in cross-sectional views in FIGS. 3 and 4. The stator is wound with suitable copper coils 42 as shown in fragmentary cross-section and suitable electrical connections (not shown) are provided for these coils. In reciprocating back and forth the linear actuator imparts a direct reciprocating motion to the compressor piston. From the combined cross-sectional views shown in FIGS. 1, 3 and 4 it will be seen that the electromagnetic linear actuator 15 is an axisymmetric device, toroidal in shape with a copper coil 42 surrounded by magnetic laminations 43 in radial planes relative to the axis of symmetry. The wedge shaped groove 41 is ground in the laminations of one of the flat faces of the toroid thus completing the forming of the stator 40. The armature 39 is preferably a radially laminated ring of magnetic material which mates with the groove of the stator. The compressor piston is such that it, along with the mechanisms associated with it, maintains the coaxial symmetry of the stator and armature as the armature reciprocates. The basic circuit used to drive the linear actuators is illustrated in FIGS. 9 and 10, and it will be described in detail in conjunction with the description of these drawings and a general explanation of the overall operation of the refrigerator, irrespective of the embodiment it assumes.

Inasmuch as it is necessary to cool the linear actuators, some form of cooling means must be provided, and in FIG. 1 these are shown to be coils 44 wrapped around the inside surface of the circular stator and in thermal contact therewith. The coils are adapted to circulate a cooling fluid from an outside source, not shown.

Each of the compressors is dynamically balanced by means of two helical spring systems in compression. The first helical spring 45 is positioned between one side of section 37 of the armature support and driving mechanism and an extended platform 46 which is integral with the central block 13. The second helical spring system 47 is positioned between the other side of section 37 of the armature support and driving mechanism and extension 48 of the inner wall of housing 19. The use of the two helical springs in compression for each of the compressor linear actuators provides the required energy storage in a compact configuration and minimizes the problem of attachment.

The use of two opposed compressors along with their linear actuator in effect results in a vibration absorbing system as far as compressor vibrations are concerned and it is therefore not necessary to provide any vibrational damping means for the compressors in the embodiment of FIG. 1.

The compressor piston moving within the tubular extension 30 defines a compression chamber 54 which communicates with a plurality of fluid passages 55 drilled in the central block 13. This block is formed of a material having good heat conductivity, e.g., aluminum, whereby the block volume 56 surrounding the passages 55 can serve as an efficient heat transfer mass communicating thermally between a cooling fluid circulated in contact with a major portion of the surface of central block 13 and the compressed fluid in passages 55.

Figure 3:
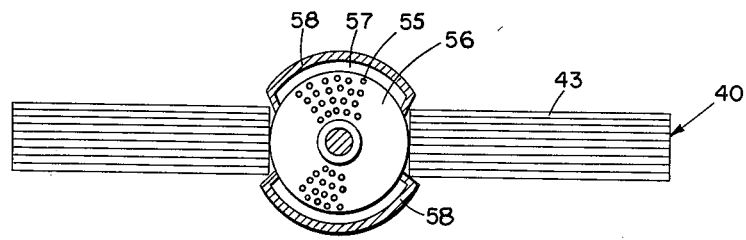
FIG. 3 is a cross-sectional view of the refrigerator of FIG. 1 taken along line 3—3 of that figure.

In FIG. 3 one means for achieving the cooling of the compressed fluid prior to its introduction to the expander is shown to consist of fluid channels 58 defining passages 57 surrounding the major portion of block 13 and through which water or another suitable coolant can be circulated. Thus the main portion of central block 13 serves the role of an aftercooler.

The fluid passages 55 communicate with a fluid collection chamber 60 (FIG. 1) located at the expander end of the aftercooler. In the apparatus of FIG. 1 this collection chamber is located in the housing base 20 which has drilled in it an annular fluid passage 61. The expander itself is mounted to the base 20 through a support plate 64 by suitable means such as screws 65. This support plate 64 also has an annular fluid passage 66 drilled through it in line with passage 61 thus providing fluid communication between the fluid collection chamber 60 and the expander.

Returning now to FIG. 1 it will be seen that there is provided a main expander piston 70 which has a smaller piston extension 71 (FIG. 2) adapted for a two-staged expander. The linear actuator connected with the expander piston comprises a stator 72 having coils 73 and an armature 74 operating within the gap 75. The electromagnetic linear actuator 16 which is associated with the expander is identical in design with that associated with the compressor. The armature 74 is in turn connected to the piston 70 through an arm 76. The upper portion of the expander piston 70 is mounted in a suitable bearing 78. The central portion of the expander piston 70 reciprocates within a passage 80 drilled in block 13, and the lower portion moves within a piston cylinder made up of an upper section 82 and a lower section 83 attached thereto through an appropriate shoulder member 84 (FIG. 2). Within the shoulder 84 is a series of perforations 85 which provide fluid access to the first expansion chamber 86. In like manner an aperture 88 in the bottom end 87 of the lower piston housing 83 provides fluid communication with a second colder expansion chamber 89.

The expander portion of the refrigerator is likewise dynamically balanced through the use of two helical springs 90 and 91 (FIG. 1) which are positioned between the stator 72 and a support collar 92 affixed to the expander piston 70 and between the central block 13 and the support collar 92, respectively. Around the expander piston cylinder sections 82 and 83 are outer cylinders 95 and 96, respectively, and these are joined by member 97 (FIG. 2). In the volume 98 which is defined between upper piston cylinder section 82 and its outer cylinder 95 are located a regenerator 100 (illustrated in FIG. 2 as stacked rings of copper or brass fine wire screening) and heat station 101. Alternatively the regenerators may be made up as photo-etched copper rings. This latter form of regenerator offers a means of obtaining a well ordered matrix of controlled dimensions (hydraulic diameter). It is also possible to use lead balls or copper wire in the regenerator. The purpose of the heat station is to stabilize the temperature of the fluid entering and leaving the bottom end of regenerator 100 in order to maximize the efficiency of the regenerator. In the volume 104 which is defined between the expander piston cylinder section 83 and its outer cylinder 96 are also regenerator 105 and heat station 106. These heat stations are preferably spaced perforated discs, and heat station 106 has associated with it as a closure for outer cylinder 96 a thermal mass 107 which is in contact with the external refrigerator load 108 represented here as a block of material. Inasmuch as the expansion chamber 89 is the colder of the two expansion chambers, the lower end of the expander is enclosed within a radiation shield 110 as an additional insulating means, and the volume 111 defined between this shield and the lower expander section is evacuated as is the volume 23 surrounding the entire expander system (FIG. 1).

The operation of the Stirling cycle is well-known and need not be described here in detail. However, it will be helpful to trace the fluid path from the compressor to the expander and then back to the compressor in this closed cycle system. Compressed fluid is forced out of both of the compressor chambers 54 through the fluid passages 55 where the heat of compression is removed by heat transfer with a suitable coolant flowing in passage 57 (FIG. 3) which essentially surrounds the block 13 and is in heat exchange relationship with the compressed fluid through volume 55 of the block. The compressed fluid collected in volume 60 is then introduced into the first regenerator 100 by way of the annular passage made up of passages 61 and 66. From the regenerator 100 the initially cooled fluid enters heat station 101, and a portion of it is introduced into the first expansion chamber 86 through openings 85 while the remaining initially cooled portion is forced down through regenerator 105, heat station 106, and into the second or colder expansion chamber 89 through opening 88. With the downward movement of the expansion piston the cold low pressure fluid is forced out of chambers 86 and 89 to return to the compressor chambers 54 by the same route. Thus the regenerators and heat stations are cooled so that they may cool the incoming fluid in the next cycle.

In the operation of the refrigerator of FIG. 1, and of all the other embodiments shown and described, the use of linear actuators minimizes all of the side loads presented to the bearing surfaces. This in turn reduces wear and offers the possibility of operating the refrigerator at a speed which is limited in practice only by the performance of the regenerators, e.g., their capability to exchange heat with the compressed and expanded fluid. The ability to operate at very high speed, e.g., 3600 cycles per minute, permits the use of small equipment for a given refrigeration output.

Figure 4:
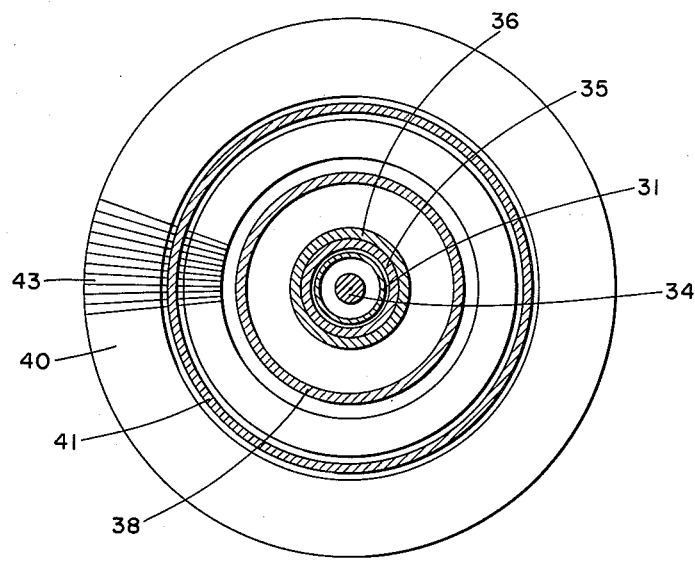
FIG. 4 is a cross-sectional view of the linear actuator associated with one of the compressors of FIG. 1 taken along line 4—4 of that figure.
Figure 5:
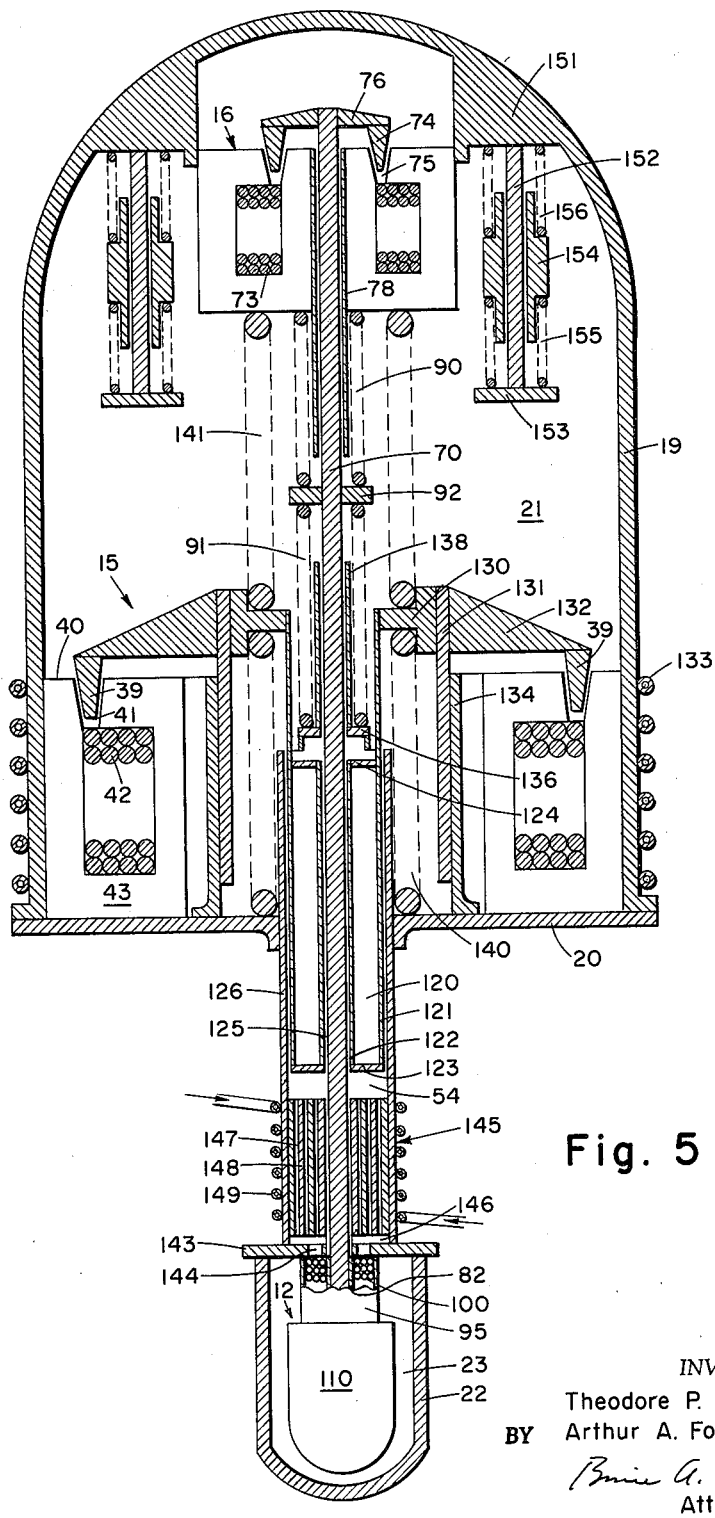
FIG. 5 is a cross-sectional view of another embodiment of the apparatus of this invention in which a single compressor and expander are arranged in axial alignment, each having its own linear actuator.

FIG. 5 is a cross-sectional view of another embodiment of this invention in which there is a single compressor in axial alignment with the expander. In this figure like numbers refer to like elements in FIGS. 1–4. The single compressor piston 120 is formed of an outer cylindrical member 121, an inner cylindrical member 122, a bottom ring 123, and a top ring 124. This compressor piston design provides a central opening 125 in the compressor through which the expansion piston 70 passes and by which it is guided. The compressor piston 120 reciprocates with compressor piston cylinder 126 which extends from within the pressurized volume 21 to beyond the confines of the pressurized housing formed of housing members 19 and 20. The outer cylindrical member 121 extends beyond the main compression piston cylinder 126 and is attached to an annular T-shaped connector piece 130. This in turn is connected to a sleeve 131 and through it and an arm piece 132 to the armature 139 of the linear actuator 15. Thus the compressor cylinder 120 is connected to and actuated by the armature of the linear actuator. Sleeve 131 in turn moves within guide channel 134. The contacting surfaces of the piston and cylinder and of the two guiding elements are preferably formed of Teflon filled with a solid lubricant such as molybdenum disulfide or other material having low coefficients of friction and expansion. A spring support 136 is attached to the extension of the outer cylindrical member 121 to provide a base for grounding helical spring 91 associated with the expander mechanism. Attached to this spring support 136 is a bearing 138 through which the expander piston 70 moves and is guided. As a means for dynamically balancing the linear actuator associated with the compressor there are provided two helical spring systems 140 and 141 which are grounded in the bottom plate of the housing 20, on the annular T-connector piece 130, and on the bottom of the stator of the linear actuator associated with the expander.

The compressor piston cylinder 126 terminates in plate 143 which has an annular passage 144 leading directly to the regenerator 100 of the expander (see FIG. 2 for expander details). Within the compressor piston cylinder 126 and below that volume 54 which makes up the compressor chamber is an intercooler 145 which defines with plate 143 a compressed fluid collection chamber 146, the purpose of which is identical to chamber 60 in FIG. 1. In the apparatus of FIG. 5 compressed fluid from chamber 54 is directed to the collection chamber 146 through channels 147 in block 148. This serves as an aftercooler to remove the heat of compression from the fluid prior to its entry into the regenerator. In the apparatus of FIG. 5 it is possible to cool this aftercooler by circulating an appropriate coolant through coils 149 which make thermal contact with the aftercooler block through the walls of cylinder 126.

In the refrigerator embodiment of FIG. 5 it is necessary to supply some form of vibration damping means. In this modification these means are attached to an extension 151 located within the main housing 19. Each of these vibration damping means comprises a rod 152 terminating in a spring support plate 153, a shoe 154 which reciprocates on the rod and helical springs 155 and 156 in compression. By proper choice of the mass of shoe 154 and characteristics of springs 155 and 156 the overall system can be tuned to eliminate essentially all vibrations which are transmitted to the housing through the reciprocation of the compressor linear actuator 15 and expander linear actuator 16. The operation of the refrigerator of FIG. 5 is identical with that of FIG. 1.

Figure 7:
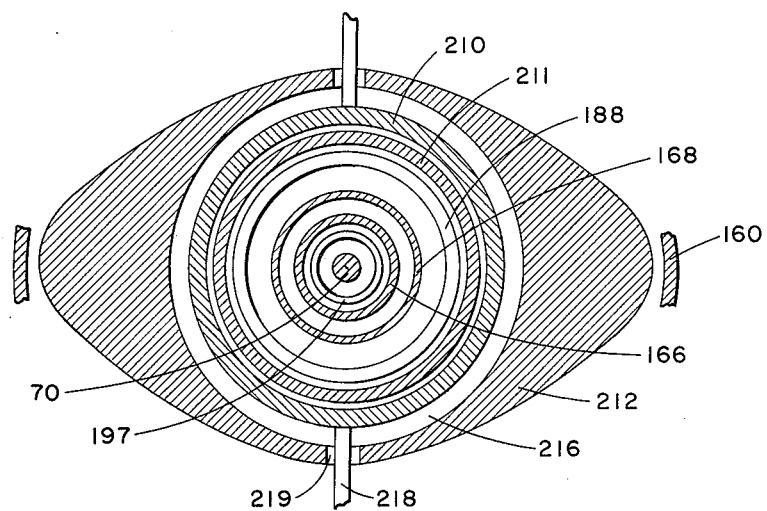
FIG. 7 is a cross-section of the refrigerator of FIG. 6 taken along line 7—7 of FIG. 6.

The embodiment illustrated in FIGS. 6 and 7 employs but a single linear actuator to drive a single compressor piston and single expander piston in axial alignment, and it incorporates a type of shuttle box and a viscous damping means to balance forces and to eliminate vibrations. In the refrigerator of FIG. 6 there are provided, as in the refrigerator embodiments of FIGS. 1 and 5, two distinct housings. The first of these is comprised of cylindrical section 160, a bottom section 161 and top section 162 and defines a pressurized volume 21. The second housing 22 is essentially the same as that of FIGS. 1 and 5, and it is evacuated. The compressor piston 164 reciprocates in compressor cylinder 165 which is in essence a tubular extension of plate 143. The compressor piston is hollow and is formed of an outer cylindrical member 166 attached to an inner cylindrical member 167. The outer cylindrical member 166 is fixed to a sleeve 168 through an annular ring 169. The sleeve 168 in turn has atached to it a support ring 170 which in turn is fixed to the upper end of a second cylindrical sleeve 171. This second sleeve is guided by and reciprocates in a bearing 172. Armature support 174 completes the necessary direct connection between the compressor piston 164 and the armature 175 of the single linear actuator. In keeping with the linear actuator design described previously the armature 175 moves within gap 176 defined within the stator 177 which, as shown in FIGS. 3 and 4, is formed of a plurality of laminae. Copper coils 178 are wound within the stator and the linear actuator is cooled by circulating a suitable coolant in coils 180 which are wound about and in thermal contact with the inner wall of the stator.

It will be appreciated from an examination of FIG. 6 that the movement of the armature 175 within the gap in the linear actuator directly imparts a reciprocating motion to the compressor piston 164 which defines with the aftercooler 145 the compressor chamber 54. As in the case of the apparatus of FIG. 5 the compressed fluid is forced through the channels 147 and is cooled by heat transfer to a coolant circulated in coils 181 which are conveniently wound in a helical fashion to make thermal contact with the outside of compressor cylinder 165. Two helical springs 185 and 188 are provided to furnish the required dynamic balancing to the driving mechanism associated with the compressor and expander pistons. Helical spring 185 is located between a bottom support 186 and the annular ring support 170 and helical spring 188 is located between this annular ring support 170 and a base 189 which is an extension of the top housing plate 162.

The expander piston 70 is essentially equivalent to that illustrated in FIGS. 1 and 2 and the expander along with regenerators and heat stations is identical to that shown in FIG. 2. However, where a single linear actuator is used, it is necessary to provide means for driving the expander piston with this linear actuator in fixed amplitude and in proper phase with the compressor piston. This is done by locating a disc member 195 on the end of the piston 70 and using it as an intermediate anchoring base for helical springs 196 and 197 which are set in extensions 198 and 199 of the outer cylindrical member 166 of the compressor piston. Motion of the compressor piston thereby imparts motion to the expander piston through the action of the helical springs. By proper selection of the helical springs 196 and 197 the expander piston can be made to reciprocate in sinusoidal motion with a phase 90 degrees in advance of the compressor piston motion, this phase relation being appropriate for good refrigeration performance. It will be seen that neither of these extensions are long enough to make contact with either the viscous damping means which is generally located at 205 or with the inner cylindrical member 167 of the compressor piston. In this refrigerator it is necessary to provide damping means to extract the work inherent in the expansion process, and in so doing to control the amplitude of the expander piston motion. One convenient type of expander piston amplitude control is a so-called viscous damping device which is sensitive to the amplitude of piston motion and depends for its operation of the flow of fluid through restricted passages to equalize fluid pressures within certain volumes. The viscous damping means 205 in FIG. 6 is comprised of a tubular extension 208 of the base disc 195 which serves in effect to form a movable closure for the volume defined within the compressor piston, leaving only the narrow passages 206 and 207 which permit the flow of fluid in and out of the interior of the piston. This in effect serves as a viscous damping member which in concert with the relatively small frictional damping produced by the expander piston bearing supports absorbs the work of expansion and controls the amplitude of the expander piston motion.

A dynamic balancing system is also provided. This comprises a cylindrical shuttle box 210 surrounding and guided by a tubular extension 211 which depends from housing top 162 and is integral with internal spring support 189. Surrounding this shuttle box is an equalizer bar 212 which in turn is mounted between two helical spring systems 213 and 214, the latter of which rests upon a support plate 215. The equilizer bar 212 is spaced from the shuttle box by a spacing 216 (see FIG. 7) and has openings 219 through which a pin 218 extends. This pin is free to rotate within opening 219 and is affixed to the shuttle box 210 thus providing corrections for any imbalances brought about by reason of the construction of the springs.

FIGS. 8a and 8b in combination illustrate in cross-section another embodiment of the refrigerator of this invention. FIG. 8a is the upper portion while FIG. 8b is the lower portion. It will be appreciated from an examination of these two drawings that they are not drawn to the same scale. This is done in order to more clearly show the detail in the drawings of FIG. 8b. No attempt has been made either in these drawings to indicate the relative length of the sections since this is not necessary and permits larger scale drawings for ease of examination.

The modification of FIGS. 8a and 8b shows the use of a single linear actuator, the incorporation of an electromagnetic damping system, a single-stage expander and the attachment of an external load in a vacuum insulated Dewar.

The refrigerator of FIGS. 8a and 8b is enclosed in a housing which is made up of three sections. The upper portion of the housing comprises a cylindrical section 225, a semicircular top 226, and a flanged base 227.

The central section of the housing comprises a cylindrical portion 228 and a shallow connical section 229 which is integral with a thermal mass block 230 forming in effect an extension of the central portion of the housing. Finally the bottom section is formed of a cylindrical portion 231 sealed to the thermal mass block 230 by means of a sealing ring 232. This cylindrical section 231 in turn is sealed to the Dewar 233 containing the external load through the use of a suitable solid sealant 234, such as an epoxy resin.

Extending from the central section down into the block 230 is the compressor cylinder 240. The compressor piston 241 is a hollow member which is integral with a base plate 242 which in turn is directly connected to the armature 175 of the linear actuator through arms 243. Thus as in the case of the other modifications illustrated, the compressor piston is given the necessary reciprocating motion through its connection with the reciprocating armature. The linear actuator of FIG. 8a is essentially the same as that shown for the refrigerator of FIG. 6. As in that refrigerator modification cooling coils 133 are provided in thermal contact with housing member 228 and are adapted to circulate a liquid for cooling the linear actuator.

In order to balance the inertia forces associated with the reciprocating mass of the armature, compressor piston, and connecting structures there are provided coil springs 246 and 247. Spring 246 is mounted in compression between the top of the block 230 and a recess in the bottom of base plate 242. Coil spring 247 is mounted in a recess in the top of base plate 242 and a horizontal base support piece 248 which is integral with an outer sleeve 249. This sleeve 249 is in turn grounded to the central portion of the housing 228 through an inclined section 251 and a horizontal section 252 the latter being held in position between the bottom flanged section 227 of the upper housing and the top of the stator 177 through a positioning piece 253. Horizontal support plate 248 is also integral with an inner sleeve 255 the purpose of which will be described hereinafter.

Compressor piston 241 defines with the upper surface of an aftercooler block 258 the compressor chamber 54. This block 258 serves the same purpose as blocks 13 of FIG. 1 and 145 of FIG. 6. However, in this modification fewer passages 259 are required to furnish fluid communication between the compressor chamber 54 and a fluid collection chamber 260. This fluid collection chamber 260 in turn communicates with an annular passage 261 of a length which is at least equal to the length of the stroke of the expander piston. Cooling of the aftercooler 258 is accomplished through the thermal mass 230 which is surrounded by a sleeve 263 having affixed thereto a number of thin heat exchange pins 264, or other heat exchange surfaces such as fins.

The expander portion of the refrigerator is illustrated in FIG. 8b. It will be seen to consist of an expander cylidner 268 which at its upper end terminates in an enlarged block section 269 sealed by means of an O-ring seal 270 to the thermal mass block 230 through a block mount 271. This arrangement makes it easy to assemble the sections through the use of suitable means as screw 272. The expander piston is formed of an upper solid section 275 and a lower hollow section 276. Between this hollow section 276 and the internal wall of the expander cylinder 268 there is a relatively large clearance 277 to minimize what may be referred to as "motional heat leak" which arises from the fact that the axial motion between the two surfaces can conduct some heat because of the axial temperature gradient which exists in the expander cylinder 268.

In the modification shown in FIG. 8b the regenerator 278 is located within the hollow portion 276 of the expander piston. The fluid passage between the fluid collection chamber 260 and the annular passage 261 is completed through radial passage 279 and central passage 280 which leads down through the bottom portion of the expander piston into regenerator 278. The bottom of the expander piston 276 is a perforated member 281 which affords fluid communication between the bottom end of the regenerator 278 and the expansion chamber 282. The expander cylinder terminates in a plug 285 which in this case is so designed as to make a tight fit with the interior of the Dewar 233 containing the external load 288 which is to be refrigerated. As seen in FIG. 8b this Dewar, which comprises an inner vessel 289 and outer vessel 290 defining between them a vacuum 291, slips up and makes a tight fit with the greater portion of expansion cylinder 268.

In the modification shown in FIG. 8b the placing of the regenerator in the expander reduces the number of axial heat flow paths to a minimum, and results in a configuration which gives rise to the ready matching of the refrigerator to a load such as a detector which is contained in an evacuated housing (the Dewar). In some cases it may be preferable to construct the elements making up the cold end of the refrigerator from a material such as a glass fiber-reinforced plastic. These materials exhibit very low thermal conductivity, high strength, and good dimensional stability with temperature changes. By making the expander piston and expander cylinder of the same material, problems of thermal conduction are minimized. In such a construction the plug 285 is conveniently formed of an aluminum-filled epoxy thereby increasing its thermal conductance to the external load while preserving thermal expansion characteristics which closely match those of the expander cylinder material.

Reverting now to FIG. 8a it is possible to follow the mechanism by which the expander piston is driven and its motion coordinated with that of the compressor piston. The compressor piston 241, as noted previously, is hollow and defines a cylindrical passage 295 through which the expander piston 275 is free to reciprocate. The expander piston 175 is mechanically connected to an upper driving piston 296 which in turn is mechanically connected to the armature 175 of the linear actuator through a sleeve extension 297 which is integral with plate 242. Two helical springs 298 and 299 are mounted in compression so that they bear upon lower and upper extensions of sleeve 297 and a plate 300 which is affixed to driving piston 296. This forms the direct connection and driving mechanism for the expander piston.

Inasmuch as the expander piston 296 is coupled to the compressor piston through springs 298 and 299 energy is delivered to the expander piston by the working fluid expanding in expansion chamber 282 and hence it is coupled back to the compressor piston by these springs to reduce the net work which must be done on the working field by the electromagnetic linear actuator. This arrangement results in stability of the phase angle of the expander reciprocation relative to compressor reciprocation. However, there remains the possibility that friction losses may disturb the amplitude of the expander piston motion and for this reason a second very small electromagnetic linear actuator 305 is incorporated to regulate electromagnetically the net damping introduced in this motion and hence to regulate amplitude of the motion. This actuator need be able to introduce only an amount of damping equivalent to the uncertainty in damping which must be accommodated. In FIG. 8a it will be seen that this small actuator 305 comprises a laminated iron core 306 in which coils 307 are wound. An iron center 308 acting as an armature, and which is an extension of the piston, reciprocates within the center of the toroidal stator core 306. Connection between this linear actuator and the piston is made through a pair of springs 310 and 311 which are grounded on an extension of inner sleeve 255, the laminated core 306 and a collar 324 which is affixed to a section of piston 296.

There is associated with this refrigerator a single vibration absorbing mechanism 315. This comprises a mass 316 of an appropriate weight surrounding the cylindrical sleeve 249 and appropriately lined with a liner 317 to form a low friction bearing surface. The mass 316 is held in position by means of two helical springs 318 and 319 which are grounded to the housing or framework of the refrigerator. In being thus spring-coupled to the housing, this vibration absorber takes essentially no part in the interaction between the compressor and expander piston motions. Because of this fact, the resulting vibratory forces acting on the housing or case are small and reducible to a value allowed by damping at the absorber.

The operation of the refrigerator can be illustrated for the modification shown in FIGS. 8a and 8b with reference to FIGS. 9 and 10. In compressing the fluid, cooling it, and delivering it to the expansion chamber for expansion and further cooling, it is of course necessary to cause the compressor and expander pistons to move in the proper sequence with the proper relationship to each other. FIG. 10 illustrates the phase relationship existing between the sinusoidal movement of the compressor and expander pistons showing that the expander piston leads the compressor piston by approximately 90°. This phase relationship will exist if the expander piston is spring-coupled to the compressor piston by a spring which is of stiffness such that it resonates with the expander piston mass at the frequency at which the compressor piston reciprocates. It is, of course, necessary to excite the linear actuators with pulsed electric power of frequency appropriate to the desired frequency of reciprocation, of phase appropriate to the desired phase relationship between compressor and expander, and of amplitudes appropriate to the desired amplitudes of motion.

One way of satisfying these excitation conditions involves the use of excitation circuits such as that illustrated in FIG. 9. For the refrigerator of FIGS. 8a and 8b there are provided two essentially equivalent circuits, one to supply power to the compressor piston actuator, the other to supply power to the expander damping actuator 305. Each of these circuits is an oscillator in which the resonant feedback is provided by the tuned spring-mass system excited by the circuit. The feedback signals are developed by magnetic pickups responsive to the reciprocating motion. The timing of signals from these pickups controls the timing of oscillator switching, and the signals are cross-coupled to the inverter circuits so that both inverters run at the same frequency, and so that the phase relationship between them is appropriate. In addition, the amplitudes of signals from these pickups is representative of the amplitudes of reciprocating motion. Thus the signals are directly coupled to the appropriate inverter in order to control the effective amplitude of excitation to regulate the amplitude of motion imparted by the associated actuator. There is therefore provided a permanent magnet 325 and its attendant coil 326. A piece of soft iron 327 is attached to the armature support arms 243 to serve as a shunting means for the magnet such that upon reciprocation of the expander piston pulses will be generated in coil 326 coincident with the extreme insertion of the expander piston and of amplitude which is dependent upon the amount of that extreme insertion. These pulses are timed appropriately to control the switching of the compressor inverter circuit and have an amplitude appropriate to regulate the effective amplitude of the inverter circuit which excites the expander. In a similar manner, permanent magnet 328 is wound with coil 329 and periodically shunted by an iron extension piece 324 in order to generate pulses responsive to compressor reciprocation. These pulses are timed appropriately to control switching of the expander damping actuator inverter circuit, and are of amplitude appropriate to control the effective amplitude of the inverter circuit which excites the compressor.

A representative basic inverter circuit which may be used to drive the linear actuators is shown schematically in FIG. 9. It will be seen to consist of a full wave transistor bridge circuit, with each transistor shunted by a steering diode to permit stored energy to flow from the linear actuator back into the battery during part of each cycle, thus to deal with the reactive impedance which the actuator presents to the inverter. The four transistors 331, 332, 333, and 334 are driven in diagonal pairs by a multivibrator 330 which is transformer-coupled to the base circuits of the bridge transistors. In the case of the inverter which excites the compressor actuator, the multivibrator 330 is driven by pulses derived from permanent magnet 325 (FIG. 8a) wound with a coil 326 and mounted to the frame of the refrigerator in such a way that at the high-pressure end of each expander stroke the magnet is shunted by a piece of soft-iron 327 carried by the armature arm 243. Thus, it develops a pulse at that point in each stroke. This timing for inverter switching is appropriate to sustained oscillations at the resonant frequency of the compressor spring-mass system.

Referring again to FIGS. 9 and 10, the operation of the regulated oscillator-inverter is as follows: In the middle of an inverter cycle, transistors 331 and 334 are conducting. Amplifier rectifier 340 is delivering a current derived from magnet coil 329 which is indicative of the amplitude of compressor reciprocation and controls the saturation level of transformers which drive the bases of transistors 333 and 334. When the voltage integral applied to the linear actuator in that cycle has been sufficient to sustain the required amplitude of reciprocation, the transformers driving the bases of transistors 333 and 334 saturate, shutting transistor 334 off. Then the inductive current flows through transistor 331 and steering diode 342, but flux in the actuator begins to decay because no more voltage is applied to the actuator. When the next switching pulse from coil 326 and multivibrator 330 arrives, transistor 331 is shut off and transistors 332 and 333 are switched on. But inductive current flows through steering diodes 342 and 343 and back into the battery 335. Flux decays rapidly to zero, and as it passes through zero, conduction switches from the steering diodes to transistors 332 and 333. This situation continues until the amplitude-regulating current saturates the transformers driving transistors 333 and 334 again. This time transistor 333 is shut off, inductive current flows through transistor 332 and steering diode 341 as flux gradually decays again because no voltage is applied to the actuator. When another inverter switch pulse from coil 326 and multivibrator 330 arrives, transistor 332 is shut off, transistors 331 and 334 are turned on, but steering diodes 341 and 344 carry the inductive current back into the battery. Flux falls to zero and begins to build up in the opposite direction as the current shifts from steering diodes 341 and 344 to transistors 331 and 334, and the cycle repeats.

In like manner permanent magnet 325 is mounted such that it is shunted by the soft iron piece 327 at the high-pressure end of each expansion stroke. Pulses derived from a coil 326 on this magnet are of amplitude which is sensitive to the terminal proximity of the soft iron shunt to the poles of the permanent magnet. Thus they can be used to regulate the amplitude of reciprocating expander motion against disturbances from variations in battery voltage, internal resistance, sliding friction in the refrigerator and the like by a circuit essentially identical to that shown in FIG. 9. To this end, the pulses are amplified, rectified and applied as saturating currents to the transformers which drive the bases of two of the transistors on the same side of the bridge in this circuit. Trigger pulses which operate the multivibrator in this case come from coil 329 and thus are insensitive to the frequency and phase of compressor piston motion.

The refrigerator of this invention readily lends itself to the incorporation of a Joule-Thomson loop which includes a suitable ballasting system, a Joule-Thomson heat exchanger and a Joule-Thomson valve. Some auxiliary heat exchangers are required and a booster compressor to initially compress the low pressure fluid returned from the Joule-Thomson loop is desirable. The concept of the incorporation of such a Joule-Thomson loop is the subject of application Serial No. 385,436, filed in the names of Walter H. Hogan and Robert W. Stuart and assigned to the same assignee as the present application. There is disclosed herein a unique apparatus for carrying out the method described in Serial No. 385,436. The incorporation of a Joule-Thomson loop permits the delivery of refrigeration at much lower temperatures, i.e., 6–8° K.

FIG. 11 is a schematic representation of a refrigerator constructed in accordance with this invention and incorporating a Joule-Thomson loop. It is assumed in FIG. 11 that the refrigerator used is that which is illustrated in FIG. 6; and in FIG. 12 there is a fragmentary cross-sectional drawing of the upper portion of the refrigerator of FIG. 6 showing how it may be modified to provide a booster compressor in accordance with the arrangements set forth in FIG. 11. The reference numerals in FIG. 11 correspond where possible to the reference numerals in FIG. 6 for convenience of coordinating these two figures. Thus the compressor and the two expansion chambers, the regenerators, the aftercooler and the heat stations are given identical reference numerals to those used in FIG. 6.

In FIG. 11 it will be seen that a portion of the cold high-pressure fluid entering the second colder expansion chamber 89 is directed to a high-pressure ballast 351 through a suitable conduit 352 in which the flow of high-pressure cold fluid is controlled by means of a check valve 353. By using a high-pressure ballast of sufficient volume it is possible to deliver essentially constant high-pressure fluid through the Joule-Thomson loop by means of the high-pressure conduit 354 which leads first into a Joule-Thomson heat exchanger 355 and then to a Joule-Thomson expansion valve 356 where the fluid is expanded, further cooled, and used to deliver refrigeration to a load represented as a heat exchanger 357. From the load the low-pressure fluid returns through a low-pressure ballast 359. In the arrangement shown in FIG. 11 the low-pressure fluid is then returned by way of conduit 360 through a series of heat exchangers numbered 361–365 which, it will be seen, are so constructed as to effect out-of-contact heat exchange with the high-pressure fluid in the heat station 106, regenerator 105, heat station 101, regenerator 100, and aftercooler 56, respectively. Finally, from the last heat exchanger 365 the low-pressure fluid is returned by way of conduit 366 and check valve 367 to a booster compressor 368 where its pressure is raised to that which is essentially equivalent to the pressure of the fluid coming into the main compressor 54 directly from the expansion chambers. A suitable connection 369 is provided between these two compressors along with a check valve 370 to control the pressure of the fluid entering compressor 354.

Minor changes to the refrigerator of FIG. 6 may be made in order to incorporate the Joule-Thomson loop and the requisite booster compressor. These changes are illustrated in FIG. 12 in which like numbers refer to like elements of FIG. 6. In order to provide a booster compressor piston a further extension is added to extension piece 198 to form a booster compressor piston 372 which has drilled in it several holes 373 to provide the necessary equalization of fluid pressures between volume 21 of the main housing and volume 205 which is associated with the viscosity damping mechanism previously described. In order to form a compressor chamber an extension 374 is affixed to the upper housing to form chamber 375 in which piston 372 can reciprocate. The low-pressure fluid is introduced into the booster compressor chamber 375 through the conduit 366 and valve 367 and the compressed fluid leaves by way of valve 370 to enter conduit 369 which is directly connected to compressor chamber 54. It will be seen that the arrangement of FIG. 12 provides for direct mechanical connection between the two pistons and hence for the reciprocation of the booster compressor piston 372 by the reciprocation of the armature of the linear actuator as shown in FIG. 6. The two compressor pistons are 180° out of phase which means that compressed fluid from the booster piston is introduced into the compressor chamber 54 essentially just prior to each compression cycle.

It will be seen from the description of FIGS. 11 and 12 that the refrigerator of this invention is inherently flexible in its application to a wide variety of refrigerating requirements. Moreover, it will be seen that the basic refrigerator concept described herein lends itself to a wide variety of embodiments, including, for example, the use of one or more compressors, the use of single or multiple-staged expanders, the employment of one or more linear actuators, and the suitable balancing of forces and elimination of vibrations by various means.

By incorporating the refrigerator in a hermetically sealed housing and pressurizing at least the upper portion of the housing which contains the compressor portion, and by the use of dry journals employing matching surfaces having low friction characteristics it is possible to provide a refrigerator which can operate for at least 1000 hours without undue wear and hence without any attendance. It will be seen from the above descriptions of the various modifications that by providing direct electric linear actuating means, using resonant spring mass systems in this driving means, and providing dynamic vibration absorbing systems it is possible to construct a refrigerator without cams, gears, and the like which is chacacterized as being small, compact, efficient and essentially free of vibrations which might be transmitted to a detector or the like and introduce unwanted noise.

It will thus be seen that the objects set forth above among those made apparent from the preceding description are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the gereric and specific features of the invention herein described and all statements of the scope of the invention which are a matter of language might be said to fall therebetween.

We claim:

1. A refrigeration apparatus, comprising in combination
    (a) at least one compressor piston reciprocally operable within a compressor cylinder thereby to define a compressor chamber of variable volume;
    (b) an expander piston reciprocally operable within an expansion cylinder thereby to define at least one expansion chamber of variable volume;
    (c) a fluid path between said compressor chamber and said expansion chamber including therein out-of-contact heat exchange means and thermal storage means;
    (d) linear electric actuating means connected to said compressor piston and said expander piston and adapted to effect the direct reciprocation of said pistons in a predetermined phase relationship; and
    (e) energy storing means adapted to balance the inertia forces associated with the reciprocating of the masses involved in effecting reciprocation of said pistons.

2. A refrigerator in accordance with claim 1 further characterized by including reciprocation amplitude regulating means associated with said pistons.

3. A refrigerator in accordance with claim 1 including a fluid-tight housing enclosing said refrigerator and adapted to have the fluid pressure therein maintained at a predetermined level.

4. A refrigeration apparatus in accordance with claim 3 including dynamic vibration absorbing means tuned to the frequency of said reciprocation of said pistons and adapted to minimize vibrations transmitted to said housing.

5. A refrigerator in accordance with claim 1 further characterized by having all dry journals associated with the moving matching surfaces, said surfaces being constructed of materials having low friction characteristics whereby said refrigerator apparatus is free from all lubricants.

6. A refrigerator in accordance with claim 1 wherein said energy storing means are resonant spring-mass systems which form a portion of the connection between said linear electric actuating means and said pistons.

7. A refrigerator in accordance with claim 1 further characterized by including means for cooling said out- of-contact heat exchange means in said fluid path.

8. A refrigerator in accordance with claim 1 further characterized by including means for cooling said linear electric actuating means.

9. A refrigeration apparatus, comprising in combination
(a) at least one compressor piston reciprocably operable within a compressor cylinder thereby to define a compressor chamber of variable volume;
(b) an expander piston reciprocally operable within an expansion cylinder thereby to define at least one expansion chamber of variable volume;
(c) a fluid path between said compressor chamber and said expansion chamber including therein out-of-contact heat exchange means and thermal storage means;
(d) linear electric actuating means directly connected to said compressor piston and said expander piston and adapted to effect the direct reciprocation of said pistons in a phase relationship such that the motion of said expander piston leads the motion of said compressor piston by approximately 90°;
(e) energy storing means adapted to balance the inertia forces associated with the reciprocating of the masses involved in effecting reciprocation of said pistons;
(f) a fluid-tight housing enclosing said refrigerator and adapted to have the fluid pressure therein maintained at a predetermined level; and
(g) dynamic vibration absorbing means tuned to the frequency of said reciprocation of said pistons and adapted to minimize vibrations transmitted to said housing.

10. A refrigerator in accordance with claim 9 further characterized by including reciprocation amplitude regulating means associated with said pistons.

11. A refrigerator in accordance with claim 9 characterized by having two opposing compressor cylinders and associated compressor pistons each of which is driven by a separate linear electric actuating means the motions of which are synchronized.

12. A refrigerator in accordance with claim 9 wherein separate linear electric actuating means are associated with said compressor piston and with said expander piston.

13. A refrigerator in accordance with claim 9 wherein a single linear electric actuating means is associated with said compressor and expander pistons.

14. A refrigerator in accordance with claim 9 wherein said linear electric actuator means comprises an axisymmetric toroidal stator having a wedge-shaped annular groove in one face and coils wound internally thereof; a ring-shaped armature of wedged cross-section which mates with said groove in said stator; and supporting means for said armature in alignment with the axis of said stator and adapted to effect reciprocating motion of said armature in said groove.

15. A refrigerator in accordance with claim 9 further characterized by having all dry journals associated with the moving matching surfaces, said surfaces being constructed of materials having low friction characteristics whereby said refrigerator apparatus is free from all lubricants.

16. A refrigerator, comprising in combination
(a) a compressor cylinder;
(b) a compressor piston reciprocally operable in said compressor cylinder defining therein a compressor chamber;
(c) an expander cylinder;
(d) an expander piston reciprocally operable in said expander cylinder and defining therein at least one expansion chamber;
(e) a fluid path communicating between said compressor chamber and said expansion chamber and including therein
(1) a multi-passaged thermal mass arranged to be cooled to serve as an aftercooler adapted to remove heat of compressor from said fluid;
(2) thermal storage means adapted to exchange heat between fluid entering said expansion chamber and fluid leaving said expansion chamber; and
(f) linear electric actuator means connected through resonant spring-mass means to said compressor piston and said expander piston and adapted to impart to said pistons sinusoidal motions wherein said expander piston motion leads said compressor piston by approximately 90°.

17. A refrigerator in accordance with claim 16 wherein said expander piston is in axial alignment with said compressor piston and extends therethrough, said pistons being driven by a common linear electric actuator means.

18. A refrigerator in accordance with claim 16 further characterized by having an auxiliary electromagnetic linear actuator associated with said expansion piston and adapted automatically to adjust the damping of said pistons effected by said resonant spring mass means.

19. A refrigerator in accordance with claim 16 wherein said expander cylinder and said expander piston are of a stepped configuration thereby defining at least two expansion chambers connected by a portion of said thermal storage means.

20. A refrigerator in accordance with claim 16 wherein said thermal storage means is positioned around said expander cylinder between said multipassaged thermal mass and said expansion chamber.

21. A refrigerator in accordance with claim 16 wherein said thermal storage mass is located internal of said expander piston.

22. A refrigerator, comprising in combination
(a) a compressor cylinder;
(b) a compressor piston reciprocally operable in said compressor cylinder defining therein a compressor chamber;
(c) an expander cylinder;
(d) an expander piston reciprocally operable in said expander cylinder and defining therein at least one expansion chamber;
(e) a fluid path communicating between said compressor chamber and said expansion chamber and including therein
(1) a multi-passaged thermal mass arranged to be cooled to serve as an aftercooler adapted to remove heat of compression from said fluid,
(2) thermal storage means adapted to exchange heat between fluid entering said expansion chamber and fluid leaving said expansion chamber;
(f) linear electric actuator means connected through resonant spring mass means to said compressor piston and said expander piston and adapted to impart to said pistons sinusoidal motions wherein said expander piston motion leads said compressor piston by approximately 90°;
(g) means for regulating the amplitude of said motions of said pistons;
(h) a fluid-tight housing enclosing said refrigerator and adapted to have the fluid pressure therein maintained at a predetermined level; and
(i) dynamic vibration absorbing means tuned to the frequency of said piston motion and arranged to minimize vibrations transmitted to said housing.

23. A refrigerator in accordance with claim 22 wherein said dynamic vibration absorbing means comprise resonant spring-mass means.

24. A refrigerator in accordance with claim 22 wherein said means for regulating the amplitude of said motions of said pistons comprises viscous damping means associated with said expander piston.

25. A refrigerator in accordance with claim 22 wherein said means for regulating the amplitude of said motions of said pistons comprise permanent magnets and associated coils positioned to be responsive to magnetic field changes effected by said motions of said pistons and adapted to transmit pulsed signals to an electric circuit associated with said linear electric actuator means.

26. A refrigerator, comprising in combination
(a) a compressor cylinder;
(b) a compressor piston reciprocally operable in said compressor cylinder defining therein a primary compressor chamber and a booster compressor chamber at opposite ends of said cylinder;
(c) valve-controlled conduit means connecting said primary and booster compressor chambers;
(d) an expander cylinder;
(e) an expander piston reciprocally operable in said expander cylinder and defining therein at least one expansion chamber;
(f) a fluid path communicating between said primary compressor chamber and said expansion chamber and including therein
   (1) a multi-passaged thermal mass arranged to be cooled to serve as an aftercooler adapted to remove heat of compression from said fluid,
   (2) thermal storage means adapted to exchange heat between fluid entering said expansion chamber and fluid leaving said expansion chamber;
(g) linear electric actuator means connected through resonant spring mass means to said compressor piston and said expander piston and adapted to impart to said pistons sinusoidal motions wherein said expander piston motion leads said compressor piston by approximately 90°;
(h) means for regulating the amplitude of said motions of said pistons;
(i) a Joule-Thomson loop in fluid communication with the coldest of said expansion chambers and comprising
   (1) a high-pressure ballast adapted periodically to receive cold, high-pressure fluid from said expansion chamber,
   (2) an expansion valve adapted to expand to further cool said high-pressure fluid delivered thereto from said high-pressure ballast at an essentially constant rate, and
   (3) a heat exchanger adapted to effect out-of-contact heat exchange between said high-pressure fluid entering said expansion valve and the expanded and further cooled fluid resulting from passage through said expansion valve; and
(j) fluid conduit means communicating between the low-pressure side of said Joule-Thomson loop and said booster compressor and adapted to effect out-of-contact heat exchange between the low-pressure fluid therein and the fluid flowing in said fluid bath.

27. A refrigerator, comprising in combination
(a) two opposing compressor pistons reciprocally operable within two compressor cylinders thereby to define two compressor chambers of variable volume;
(b) an expander piston of stepped configuration reciprocally operable within an expansion cylinder of stepped configuration thereby to define at least two expansion chambers of variable volume and successively colder temperatures;
(c) a fluid path between said compressor chambers and said expander chambers including
   (1) a multi-passaged thermal mass arranged to to be cooled to serve as an aftercooler;
   (2) fluid collection means,
   (3) a first thermal storage means associated and communicating with said first expansion chamber and with
   (4) a second thermal storage means associated and communicating with said second expansion chamber,
(d) a first linear electric actuating means connected to said compressor pistons and adapted to impart synchonized reciprocating motion thereto;
(e) a second linear electric actuating means connected to said expander piston and adapted to impart reciprocating motion thereto in phase relationship with the reciprocating motion of said compressor pistons such that the motion of said expander piston leads the motion of said compressor piston by approximately 90°;
(f) energy absorbing means adapted to balance the inertia forces associated with the reciprocating of the masses involved in effecting reciprocation of said pistons, said energy absorbing means being resonant spring-mass systems which form a portion of the connection between said first and second linear electric actuating means and said pistons; and
(g) fluid-tight housing means including a first section enclosing that portion of the refrigerator normally maintained at ambient temperature, and a second section enclosing the remaining colder portion of said refrigerator.

28. A refrigerator in accordance with claim 27 further characterized by having means for cooling said linear actuators associated with said compressor pistons.

29. A refrigerator apparatus comprising in combination
(a) a compressor piston reciprocally operable within a compressor cylinder thereby a defiine a compressor chamber of variable volume;
(b) an expander piston reciprocally operable within an expansion cylinder thereby to define first and second expander chambers of variable volume, said expander piston extending through said compressor piston and being movable therein;
(c) a fluid path between said compressor chamber and said expander chambers including
   (1) a multi-passaged thermal mass,
   (2) cooling means associated with said mass,
   (3) fluid collection means,
   (4) a first thermal storage means associated and communicating with said first expander chamber and with
   (5) a second thermal storage means associated and communicating with said second expander chamber;
(d) a first linear electric actuating means connected to said compressor piston and adapted to effect the direct reciprocating of said compressor piston;
(e) a second linear electric actuating means connected to said expander piston and adapted to effect direct reciprocation of said expander piston in a phase relationship such that it leads the motion of said compressor piston by approximately 90°;

(f) helical spring means associated with said first and second linear electric actuating means adapted to balance the energy forces associated with the reciprocating masses involved in effecting reciprocation of said pistons;

(g) fluid-tight housing means including a first section enclosing that part of the refrigerator maintained at essentially ambient temperature and serving in part as said compressor cylinder, and a second section enclosing the remaining colder portion of said refrigerator; and (h) dynamic vibration absorbing means tuned to the frequency of said reciprocation of said pistons and adapted to minimize vibrations transmitted to said housing.

30. A refrigerator, comprising in combination (a) a compressor piston reciprocally operable within a compressor cylinder thereby to define a compressor chamber of variable volume;

(b) an expander piston reciprocally operable within an expansion cylinder thereby to define first and second expansion chambers of variable volume, said expander piston extending through said compressor piston and being movable therein;

(c) a fluid path between said compressor chamber and said expander chambers including
 (1) a multi-passaged thermal mass,
 (2) cooling means associated with said mass,
 (3) fluid collection means,
 (4) a first thermal storage means associated and communicating with said first expander chamber and with
 (5) a second thermal storage means associated and associated and communicating with said second expander chamber (d) linear electric actuating means connected to said compressor piston and to said expander piston and adapted to effect direct reciprocation of pistons such that the motion of said expander piston leads the motion of said compressor piston by approximately 90°;

(f) helical spring means associated with said direct electric linear actuator adapted to balance the energy forces associated with the reciprocating masses involved in effecting reciprocation of said pistons and to form a part of the connection between said actuating means and said pistons;

(g) fluid-tight housing means including a first section enclosing that portion of the refrigerator normally maintained at ambient temperature, and a second section enclosing the remaining colder portion of said refrigerator;

(h) dynamic vibration absorbing means tuned to the frequency of said reciprocation of said pistons and adapted to minimize vibrations transmitted to said housing.

31. A refrigerator, comprising in combination (a) a compressor piston reciprocally operable within a compressor cylinder thereby to define a compressor chamber of variable volume;

(b) an expander piston reciprocally operable within an expansion cylinder thereby to define an expansion chamber of variable volume, said expander piston extending through said compressor piston and being moveable therein;

(c) a fluid patch between said compressor chamber and said expander chamber including
 (1) a multi-passaged thermal mass,
 (2) cooling means associated with said mass,
 (3) fluid collection means,
 (4) thermal storage means internal of said expander piston and communicating between said fluid collection means and said expander chamber;

(d) linear electric actuating means connected to said compressor piston and to said expander piston and adapted to effect direct reciprocation of said pistons in a phase relationship such that the motion of said expander piston leads the motion of said compressor piston by approximately 90°;

(e) energy absorbing means adapted to balance the inertia forces associated with the reciprocating of the masses involved in effecting reciprocation of said pistons, said energy absorbing means including spring means which form a part of the connection between said actuating means and said pistons;

(f) reciprocating amplitude regulating means associated with said pistons;

(g) housing means; and (h) dynamic vibration absorbing means tuned to the frequency of said reciprocation of said pistons and adapted to minimize vibrations transmitted to said housing.

32. A refrigerator in accordance with claim 31 wherein said cooling means associated with said thermal mass comprises finned heat transfer surfaces in thermal contact therewith.

33. A refrigerator in accordance with claim 31 wherein said energy absorbing means also includes an auxiliary linear electric actuating means associated with said expander piston.

34. A refrigerator in accordance with claim 31 wherein said housing means is adapted to be joined to a refrigeration loading housing whereby said refrigeration load is brought into thermal contact with cold fluid in said expander chamber.

35. A refrigerator in accordance with claim 31 further characterized by having all dry journals associated with the moving matching surfaces, said surfaces being constructed of materials having low friction characteristics whereby said refrigerator apparatus is free from all lubricants.

36. A refrigerator in accordance with claim 31 wherein said linear electric actuator means comprises an axi-symmetric torodial stator having a wedge-shaped annular groove in one face and coils wound internally thereof; a ring-shaped armature of wedged cross-section which mates with said groove in said stator; and supporting means for said armature in alignment with the axis of said stator and adapted to effect reciprocating motion of said armature in said groove.

37. A refrigeration appartus, comprising in combination (a) at least one compressor piston reciprocally operable within a compressor cylinder thereby to define a compressor chamber of variable volume;

(b) an expander piston reciprocally operable within an expansion cylinder thereby to define at least one expansion chamber of variable volume;

(c) a fluid path between said compressor chamber and said expander chamber including therein out-of-contact heat exchange means and thermal storage means;

(d) linear electric actuating means connected to said compressor piston and said expander piston and adapted to effect the direct reciprocation of said pistons in a predetermined phase relationship;

(e) energy storing means adapted to balance the inertia forces associated with the reciprocating of the masses involved in effecting reciprocation of said pistons; and (f) power supply means associated with said linear electric actuating means adapted to excite said linear actuating means with pulsed electric power of a frequency appropriate to the desired frequency of reciprocation of said pistons and at said predetermined phase relationship.

38. A refrigerator, comprising in combination (a) a compressor cylinder;

(b) a compressor piston reciprocally operable in said compressor cylinder defining therein a compressor chamber;

(c) an expander cylinder;

(d) an expander piston reciprocally operable in said expander cylinder and defining therein at least one expansion chamber;

(e) a fluid path communicating between said compressor chamber and said expansion chamber and including therein (1) a multi-passaged thermal mass arranged to be cooled to serve as an aftercooler adapted to remove heat of compression from said fluid, and (2) thermal storage means adapted to exchange heat between fluid entering said expansion chamber and fluid leaving said expansion chamber;

(f) linear electric actuator means connected through tuned resonant spring-mass means to said compressor piston and said expander piston and adapted to impart to said pistons sinusoidal motions wherein said expander piston motion leads said compressor piston motion by approximately 90°; and (g) power supply means associated with said linear electric actuator means adapted to excite said linear actuator means with pulsed electric power of a frequency appropriate to the desired frequency of reciprocation of said pistons at the established phase relationship, said power supply means comprising oscillator circuit means having resonant feedback means provided by said tuned spring-mass means.

39. A refrigerator in accordance with claim 38 including means for regulating the amplitude of said motions of said pistons, said means comprising permanent magnets and associated coils positioned to be responsive to magnetic field changes effected by said motions of said pistons and adapted to transmit pulsed signals to said feedback means.

References Cited by the Examiner

UNITED STATES PATENTS 3,188,821   6/1965   Chellis _____ 62—6

WILLIAM J. WYE, *Primary Examiner.*